United States Patent
Henrikson

(10) Patent No.: US 10,296,037 B2
(45) Date of Patent: May 21, 2019

(54) PEDAL ASSEMBLY WITH IDENTICAL FIRST AND SECOND HOUSING COMPONENTS

(71) Applicant: Kongsberg Power Products Systems I, Inc., Willis, TX (US)

(72) Inventor: Jesse Henrikson, Conroe, TX (US)

(73) Assignee: Kongsberg Power Products Systems I, Inc., Willis, TX (US)

(*) Notice: Subject to any disclaimer, the term of this patent is extended or adjusted under 35 U.S.C. 154(b) by 0 days.

(21) Appl. No.: 15/760,338

(22) PCT Filed: Sep. 16, 2016

(86) PCT No.: PCT/US2016/052174
§ 371 (c)(1),
(2) Date: Mar. 15, 2018

(87) PCT Pub. No.: WO2017/049112
PCT Pub. Date: Mar. 23, 2017

(65) Prior Publication Data
US 2018/0259995 A1 Sep. 13, 2018

Related U.S. Application Data

(60) Provisional application No. 62/220,503, filed on Sep. 18, 2015.

(51) Int. Cl.
*G05G 1/30* (2008.04)
*G05G 5/05* (2006.01)
(Continued)

(52) U.S. Cl.
CPC ............. *G05G 1/44* (2013.01); *B60K 26/02* (2013.01); *B60T 7/04* (2013.01); *B60T 7/042* (2013.01);
(Continued)

(58) Field of Classification Search
CPC .. G05G 1/30; G05G 1/38; G05G 1/44; G05G 1/445; G05G 5/02; G05G 2505/00;
(Continued)

(56) References Cited

U.S. PATENT DOCUMENTS 2,125,446 A 8/1938 Hurtt
3,494,673 A 2/1970 Wilcox
(Continued)

FOREIGN PATENT DOCUMENTS

CN 2647929 Y 10/2004
CN 101239617 A 8/2008
(Continued)

OTHER PUBLICATIONS

English language abstract for FR3008666 extracted from espacenet.com on Aug. 2, 2018; 2 pages.
(Continued)

*Primary Examiner* — Adam D Rogers
(74) *Attorney, Agent, or Firm* — Howard & Howard Attorneys PLLC

(57) ABSTRACT

A pedal assembly for a vehicle, including a pedal arm, a pivot shaft operatively attached to the pedal arm and defining a pivot axis, and identical and housing components. The housing components each have a body defining an inner surface and an outer surface, a mount formed on the body and adapted for attachment to the vehicle, a receiver formed on the body extending away from the outer surface, a coupler formed on the body extending away from the outer surface and disposed in spaced relation with the receiver, and a bore defined along the inner surface arranged between the receiver and the coupler to support at least a portion of the pivot shaft. Each respective receiver engages the corresponding coupler in an interlocked configuration with the bores being aligned about the pivot axis to rotatably support the pivot shaft for rotation about the pivot axis.

28 Claims, 12 Drawing Sheets

(51) Int. Cl.
   *B60T 7/04* (2006.01)
   *B60K 26/02* (2006.01)
   *G05G 1/44* (2008.04)
   *G05G 1/38* (2008.04)

(52) U.S. Cl.
   CPC .............. *G05G 1/30* (2013.01); *G05G 1/38* (2013.01); *G05G 5/05* (2013.01); *B60Y 2304/05* (2013.01); *B60Y 2304/07* (2013.01)

(58) Field of Classification Search
   CPC .......... G05G 5/05; B60K 26/02; B60T 7/042; B60T 7/04; B60Y 2304/05; B60Y 2304/07
   See application file for complete search history.

(56) References Cited

U.S. PATENT DOCUMENTS

| | | | |
|---|---|---|---|
| 3,901,570 A | 8/1975 | Alexander | |
| 5,575,181 A | 11/1996 | Baumann | |
| 5,618,107 A | 4/1997 | Bartsch | |
| 5,829,317 A | 11/1998 | Vreeken et al. | |
| 6,220,222 B1* | 4/2001 | Kalsi | B60K 26/02 123/399 |
| 6,330,838 B1* | 12/2001 | Kalsi | B60K 26/02 200/61.89 |
| 6,431,021 B1 | 8/2002 | Djordjevic et al. | |
| 6,446,525 B1 | 9/2002 | Borchers | |
| 6,453,768 B2 | 9/2002 | Wehner et al. | |
| 6,526,844 B1 | 3/2003 | Weis | |
| 6,915,717 B2* | 7/2005 | Burgstaler | B60T 7/065 403/150 |
| 6,938,754 B2 | 9/2005 | Kanaris | |
| 8,240,230 B2 | 8/2012 | Peniston et al. | |
| 8,939,045 B2 | 1/2015 | Yamaguchi et al. | |
| 9,188,163 B2 | 11/2015 | Isenberg et al. | |
| 9,360,882 B2* | 6/2016 | Kaijala | G05G 1/38 |
| 9,811,108 B2* | 11/2017 | Kumamoto | G01B 7/30 |
| 9,975,527 B2* | 5/2018 | Kawazu | B60T 7/06 |
| 2001/0015110 A1 | 8/2001 | Scheidling et al. | |
| 2001/0015112 A1 | 8/2001 | Popowich | |
| 2003/0005791 A1 | 1/2003 | Elgart | |
| 2003/0025389 A1 | 2/2003 | Ersoy et al. | |
| 2004/0083846 A1 | 5/2004 | Sundaresan et al. | |
| 2005/0081676 A1 | 4/2005 | Kim | |
| 2008/0149411 A1 | 6/2008 | Schlabach et al. | |
| 2010/0107805 A1 | 5/2010 | Bryce | |
| 2012/0060642 A1 | 3/2012 | Yamaguchi et al. | |
| 2012/0148179 A1 | 6/2012 | Kondo et al. | |
| 2012/0272785 A1 | 11/2012 | Kaiser | |
| 2012/0279346 A1 | 11/2012 | Canavan | |
| 2013/0133472 A1 | 5/2013 | Burguera Albizuri et al. | |
| 2013/0283961 A1 | 10/2013 | Kaijala | |
| 2014/0090512 A1* | 4/2014 | Kaijala | G05G 1/38 74/514 |
| 2014/0311275 A1 | 10/2014 | Kim et al. | |
| 2015/0096407 A1 | 4/2015 | Fuller et al. | |
| 2017/0227047 A1 | 8/2017 | Fujiwara | |

FOREIGN PATENT DOCUMENTS

| | | | |
|---|---|---|---|
| CN | 201099179 Y | 8/2008 | |
| CN | 201261853 Y | 6/2009 | |
| CN | 101634608 A | 1/2010 | |
| CN | 201646485 U | 11/2010 | |
| CN | 201816576 U | 5/2011 | |
| CN | 201840793 U | 5/2011 | |
| CN | 202098326 U | 1/2012 | |
| CN | 102582524 A | 7/2012 | |
| CN | 102634193 A | 8/2012 | |
| CN | 202405687 U | 8/2012 | |
| CN | 202414076 U | 9/2012 | |
| CN | 202507935 U | 10/2012 | |
| CN | 202518184 U | 11/2012 | |
| CN | 202669783 U | 1/2013 | |
| CN | 202686155 U | 1/2013 | |
| CN | 103253146 A | 8/2013 | |
| CN | 103253256 A | 8/2013 | |
| CN | 103318162 A | 9/2013 | |
| CN | 203264980 U | 11/2013 | |
| CN | 203293999 U | 11/2013 | |
| CN | 103481879 A | 1/2014 | |
| CN | 203485766 U | 3/2014 | |
| CN | 203601240 U | 5/2014 | |
| CN | 203805706 U | 9/2014 | |
| CN | 203834917 U | 9/2014 | |
| CN | 203937106 U | 11/2014 | |
| CN | 104228576 A | 12/2014 | |
| CN | 203996484 U | 12/2014 | |
| CN | 203996604 U | 12/2014 | |
| CN | 204037350 U | 12/2014 | |
| CN | 104358512 A | 2/2015 | |
| CN | 204136968 U | 2/2015 | |
| CN | 104448675 A | 3/2015 | |
| CN | 104499927 A | 4/2015 | |
| CN | 104553783 A | 4/2015 | |
| CN | 104590021 A | 5/2015 | |
| CN | 104709086 A | 6/2015 | |
| CN | 104709249 A | 6/2015 | |
| DE | 10336799 A1 | 3/2005 | |
| DE | 102004057571 A1 | 6/2006 | |
| DE | 102005004997 A1 | 8/2006 | |
| DE | 202006016389 U1 | 12/2006 | |
| DE | 102012213666 A1 | 2/2014 | |
| EP | 0712511 A1 | 5/1996 | |
| EP | 0714056 A1 | 5/1996 | |
| EP | 1126353 A2 | 8/2001 | |
| EP | 1128976 A1 | 9/2001 | |
| EP | 1173353 A1 | 1/2002 | |
| EP | 1237768 A1 | 9/2002 | |
| EP | 1379416 A1 | 1/2004 | |
| EP | 1391799 A1 | 2/2004 | |
| EP | 1555179 A1 | 7/2005 | |
| EP | 1654607 A1 | 5/2006 | |
| EP | 1943577 A2 | 7/2008 | |
| EP | 2053483 A1 | 4/2009 | |
| EP | 2071426 A1 | 6/2009 | |
| EP | 2075665 A1 | 7/2009 | |
| EP | 2370241 A1 | 10/2011 | |
| EP | 2818962 A1 | 12/2014 | |
| EP | 2826680 A1 | 1/2015 | |
| EP | 2299245 B1 * | 6/2015 | ............. G01D 5/145 |
| FR | 2924973 A1 | 6/2009 | |
| FR | 2946162 A1 | 12/2010 | |
| FR | 3008666 A1 | 1/2015 | |
| GB | 1128370 A | 9/1968 | |
| JP | 2008195225 A | 8/2008 | |
| KR | 100890995 B1 | 3/2009 | |
| KR | 20090067353 A | 6/2009 | |
| WO | 200035727 A1 | 6/2000 | |
| WO | 02081277 A1 | 10/2002 | |
| WO | 200431880 A1 | 4/2004 | |
| WO | 2005006104 A1 | 1/2005 | |
| WO | 2008023369 A2 | 2/2008 | |
| WO | 2009087103 A1 | 7/2009 | |
| WO | 2010146246 A1 | 12/2010 | |
| WO | 2011054562 A1 | 5/2011 | |
| WO | 2013052628 A2 | 4/2013 | |
| WO | 2017049112 A1 | 3/2017 | |
| WO | WO-2017049099 A9 * | 5/2017 | ............... G05G 1/44 |

OTHER PUBLICATIONS

English language abstract and computer-generated translation for JP2008195225 extracted from espacenet.com on Jul. 31, 2018; 10 pages.

English language abstract and computer-generated translation for KR100890995 extracted from espacenet.com on Jul. 31, 2018; 4 pages.

English language abstract and computer-generated translation for KR20090067353 extracted from espacenet.com on Jul. 31, 2018; 4 pages.

(56) References Cited

OTHER PUBLICATIONS

English language abstract and computer-generated translation for WO0035727 extracted from espacenet.com on Jul. 31, 2018; 15 pages.
English language abstract and computer-generated translation for WO2004031880 extracted from espacenet.com on Aug. 1, 2018; 2 pages.
English language abstract for WO2005006104 extracted from espacenet.com on Aug. 3, 2018; 1 page.
English language abstract for WO02081277 extracted from espacenet.com on Aug. 2, 2018; 2 pages.
English language abstract for WO2009087103 extracted from espacenet.com on Aug. 1, 2018; 1 page.
English language abstract for WO2010146246 extracted from espacenet.com on Aug. 3, 2018; 2 pages.
English language abstract for WO2017049099 extracted from espacenet.com on Aug. 2, 2018; 2 pages.
International Search Report and Written Opinion for PCT/US2016/052174 dated Dec. 9, 2016; 11 pages.
International Search Report and Written Opinion for PCT/US2016/052156 dated Dec. 14, 2016; 8 pages.
English language abstract and computer-generated translation for CN2647929 extracted from espacenet.com on Jul. 31, 2018; 5 pages.
English language abstract and computer-generated translation for CN101239617 extracted from espacenet.com on Jul. 31, 2018; 6 pages.
English language abstract and computer-generated translation for CN101634608 extacted from espacenet.com on Jul. 31, 2018; 9 pages.
English language abstract and computer-generated translation for CN102582524 extracted from espacenet.com on Jul. 31, 2018; 4 pages.
English language abstract for CN102634193 extracted from espacenet.com on Jul. 31, 2018; 1 page.
English language abstract and computer-generated translation for CN103253146 extracted from espacenet.com on Jul. 31, 2018; 14 pages.
English language abstract for CN103318162 extracted from espacenet.com on Jul. 31, 2018; 1 page.
English language abstract for CN103481879 extracted from espacenet.com on Jul. 31, 2018; 1 page.
English language abstract and computer-generated translation for CN104228576 extracted from espacenet.com on Jul. 31, 2018; 7 pages.
English language abstract and computer-generated translation for CN104358512 extracted from espacenet.com on Jul. 31, 2018; 4 pages.
English language abstract for CN104448675 extracted from espacenet.com on Jul. 31, 2018; 1 page.
English language abstract and computer-generated translation for CN104499927 extracted from espacenet.com on Jul. 31, 2018; 4 pages.
English language abstract and computer-generated translation for CN104553783 extracted from espacenet.com on Jul. 31, 2018; 6 pages.
English language abstract and computer-generated translation for CN104590021 extracted from espacenet.com on Jul. 31, 2018; 4 pages.
English language abstract for CN104709086 extracted from espacenet.com on Aug. 2, 2018; 1 page.
English language abstract and computer-generated translation for CN104709249 extracted from espacenet.com on Jul. 31, 2018; 6 pages.
English language abstract and computer-generated translation for CN201099179 extracted from espacenet.com on Jul. 31, 2018; 5 pages.
English language abstract and computer-generated translation for CN201261853 extracted from espacenet.com on Jul. 31, 2018; 4 pages.
English language abstract and computer-generated translation for CN201646485 extracted from espacenet.com on Jul. 31, 2018; 6 pages.
English language abstract for CN201816576 extracted from espacenet.com on Jul. 31, 2018; 1 page.
English language abstract and computer-generated translation for CN201840793 extracted from espacenet.com on Jul. 31, 2018; 5 pages.
English language abstract and computer-generated translation for CN202098326 extracted from espacenet.com on Jul. 31, 2018; 4 pages.
English language abstract and computer-generated translation for CN202405687 extracted from espacenet.com on Jul. 31, 2018; 4 pages.
English language abstract and computer-generated translation for CN202414076 extracted from espacenet.com on Jul. 31, 2018; 7 pages.
English language abstract for CN202507935 extracted from espacenet.com on Jul. 31, 2018; 7 pages.
English language abstract and computer-generated translation for CN202518184 extracted from espacenet.com on Jul. 31, 2018; 4 pages.
English language abstract and computer-generated translation for CN202669783 extracted from espacenet.com on Jul. 31, 2018; 4 pages.
English language abstract and computer-generated translation for CN202686155 extracted from espacenet.com on Jul. 31, 2018; 4 pages.
English language abstract and computer-generated translation for CN203264980 extracted from espacenet.com on Jul. 31, 2018; 4 pages.
English language abstract and computer-generated translation for CN203293999 extracted from espacnet.com on Jul. 31, 2018; 4 pages.
English language abstract and computer-generated translation for CN203485766 extracted from espacenet.com on Jul. 31, 2018; 5 pages.
English language abstract and computer-generated translation for CN203601240 extracted from espacenet.com on Jul. 31, 2018; 5 pages.
English language abstract and computer-generated translation for CN203805706 extracted from espacenet.com on Jul. 31, 2018; 5 pages.
English language abstract and computer-generated translation for CN203834917 extracted from espacenet.com on Jul. 31, 2018; 7 pages.
English language abstract and computer-generated translation for CN203937106 extracted from espacenet.com on Jul. 31, 2018; 5 pages.
English language abstract and computer-generated translation for CN203996484 extracted from espacenet.com on Jul. 31, 2018; 4 pages.
English language abstract and computer-generated translation for CN203996604 extracted from espacenet.com on Jul. 31, 2018; 4 pages.
English language abstract for CN204037350 extracted from espacenet.com on Jul. 31, 2018; 1 page.
English language abstract and computer-generated translation for CN204136968 extracted from espacenet.com on Jul. 31, 2018; 5 pages.
English language abstract and computer-generated translation for DE10336799 extracted from espacenet.com on Jul. 31, 2018; 10 pages.
English language abstract and computer-generated translation for DE102004057571 extracted from espacenet.com on Jul. 31, 2018; 6 pages.
English language abstract and computer-generated translation for DE10200504997 extracted from espacenet.com on Jul. 31, 2018; 7 pages.
English language abstract and computer-generated translation for DE102012213666 extracted from espacenet.com on Jul. 31, 2018; 9 pages.

(56) References Cited

OTHER PUBLICATIONS

English language abstract and computer-generated translation for DE202006016389 extracted from espacenet.com on Jul. 31, 2018; 7 pages.
English language abstract for EP1379416 extracted from espacenet.com on Aug. 2, 2018; 1 page.
English language abstract and computer-generated translation for EP2826680 extracted from espacenet.com on Aug. 3, 2018; 11 pages.
English language abstract and computer-generated translation for FR2924973 extracted from espacenet.com on Jul. 31, 2018; 7 pages.
English language abstract for FR2946162 extracted from espacenet.com on Aug. 1, 2018; 1 page.

* cited by examiner

PEDAL ASSEMBLY WITH IDENTICAL FIRST AND SECOND HOUSING COMPONENTS

CROSS-REFERENCE TO RELATED APPLICATIONS

The subject patent application is the National Stage of International Patent Application No. PCT/US2016/052174, filed on Sep. 16, 2016, which claims priority to and all the benefits of U.S. Provisional Patent Application Ser. No. 62/220,503, which was filed on Sep. 18, 2015, the disclosure of which is hereby incorporated by reference.

BACKGROUND OF THE INVENTION

1. Field of the Invention

The present invention relates, generally, to pedal assemblies for vehicles and, more specifically, to a pedal assembly with identical first and second housing components.

2. Description of the Related Art

Conventional pedal assemblies known in the art are employed to allow a driver to selectively control operation of a vehicle. To that end, pedal assemblies may be realized as an "accelerator pedal" used to control vehicle acceleration and modulate vehicle speed, a "brake pedal" used to control vehicle deceleration and stop the vehicle, or a "clutch pedal" used to modulate translation of rotational torque between an engine and a transmission.

It will be appreciated that pedal assemblies are used in a number of different applications, such as the automotive, construction, agriculture, recreational, and/or power sports industries. Irrespective of the particular application, it is desirable for the pedal assembly to operate consistently over the life of the vehicle. Moreover, it is desirable for vehicles to operate as efficiently as possible in order to promote reduced emissions, reduced fuel and/or energy consumption, optimized and increased vehicle performance, and the like. Similarly, it is desirable for each of the components of a vehicle, including pedal assemblies, to be manufactured and assembled in an efficient, low-cost manor. However, conventional pedal assemblies tend to employ a relatively large number of different components which need to be manufactured separately and subsequently assembled.

While conventional pedal assemblies known in the related art have generally performed well for their intended use, they tend to be relatively cumbersome to manufacture and assemble, may be relatively heavy and require a large packaging size, and often employ a large number of different components. While these conventional pedal assemblies have generally performed well for their intended use, there remains a need in the art for a pedal assembly which can operate consistently and reliably in different environments, which can be manufactured and assembled in an efficient and cost-effective manor while, at the same time, affording minimal packaging size and component weight, and which can be manufactured using relatively fewer components to effect proper operation in use.

SUMMARY OF THE INVENTION AND ADVANTAGES

The present invention overcomes the disadvantages in the prior art in a pedal assembly for a vehicle, including a pedal arm and a pivot shaft operatively attached to the pedal arm. The pivot shaft defines a pivot axis. The pedal assembly also includes a first housing component having a first body defining a first inner surface and a first outer surface. A first mount is formed on the first body and is adapted for attachment to the vehicle. A first receiver is formed on the body extending away from the first outer surface. A first coupler is formed on the first body extending away from the first outer surface and is disposed in spaced relation with the first receiver. A first bore is defined along the first inner surface and is arranged between the first receiver and the first coupler to support at least a portion of the pivot shaft. The pedal assembly further includes a second housing component having a second body identical to the first body. The second body defines a second inner surface identical to the first inner surface, and a second outer surface identical to the first outer surface. A second mount, identical to the first mount, is formed on the second body and is adapted for attachment to the vehicle. A second receiver, identical to the first receiver, is formed on the second body extending away from the second outer surface. A second coupler, identical to the first coupler, is formed on the second body extending away from the second outer surface and is disposed in spaced relation with the second receiver. A second bore, identical to the first bore, is defined along the second inner surface arranged between the second receiver and the second coupler to support at least a portion of the pivot shaft. The first receiver engages the second coupler and the second receiver engages the first coupler in an interlocked configuration when the first housing component is mounted to said second housing component with the first bore and the second bore being aligned about the pivot axis to rotatably support the pivot shaft for rotation about the pivot axis in response to movement of the pedal arm.

In this way, the pedal assembly of the present invention provides improved functionality and usability in connection with vehicles and, at the same time, reduces the cost and complexity of manufacturing and assembling pedal assemblies which can operate reliably and predictably in a number of different environments.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
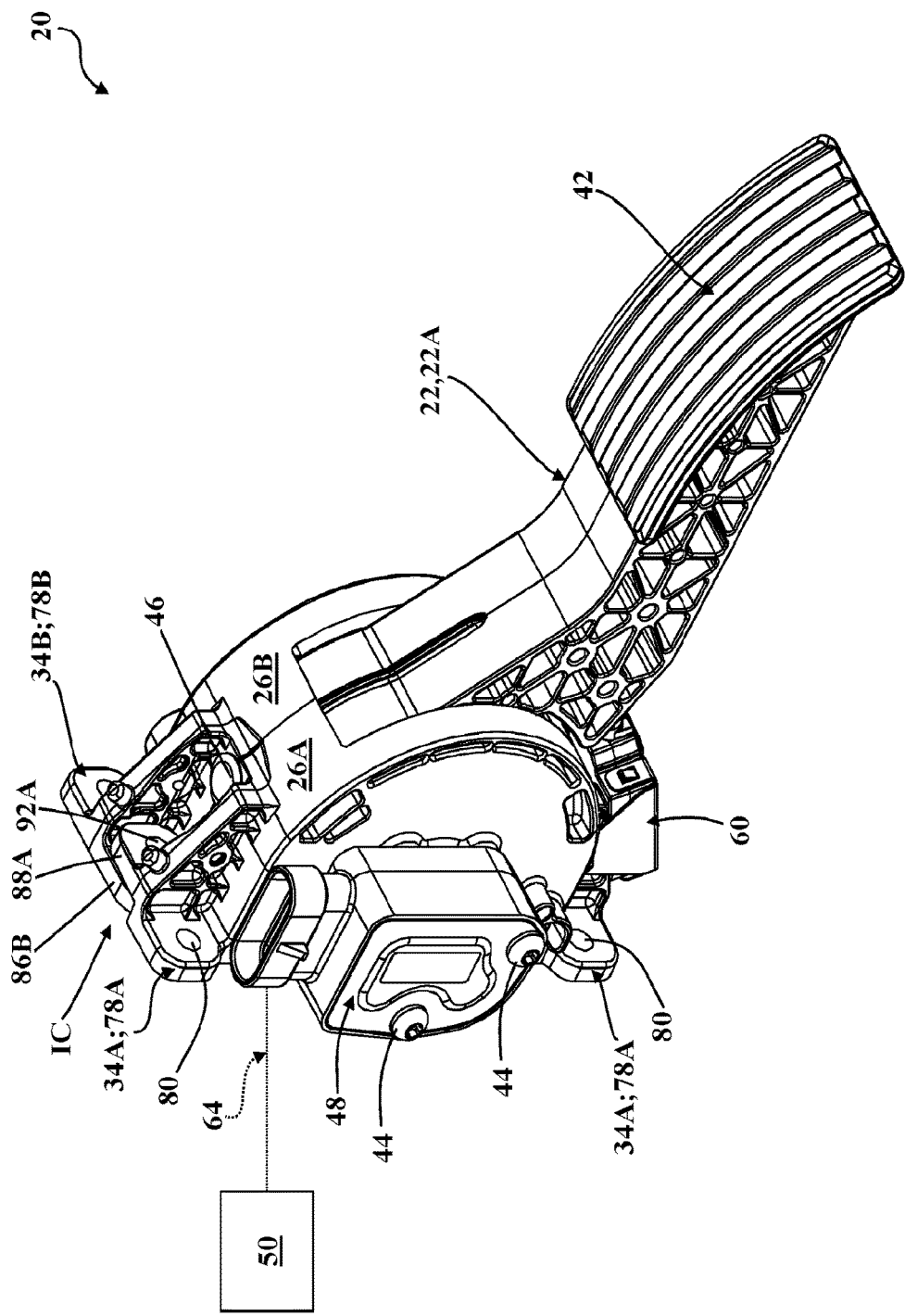
FIG. 1 is a perspective view of a pedal assembly having a pair of identical first and second housing components supporting a pivot shaft operatively attached to a pedal arm, according to one embodiment of the present invention.
Figure 2:
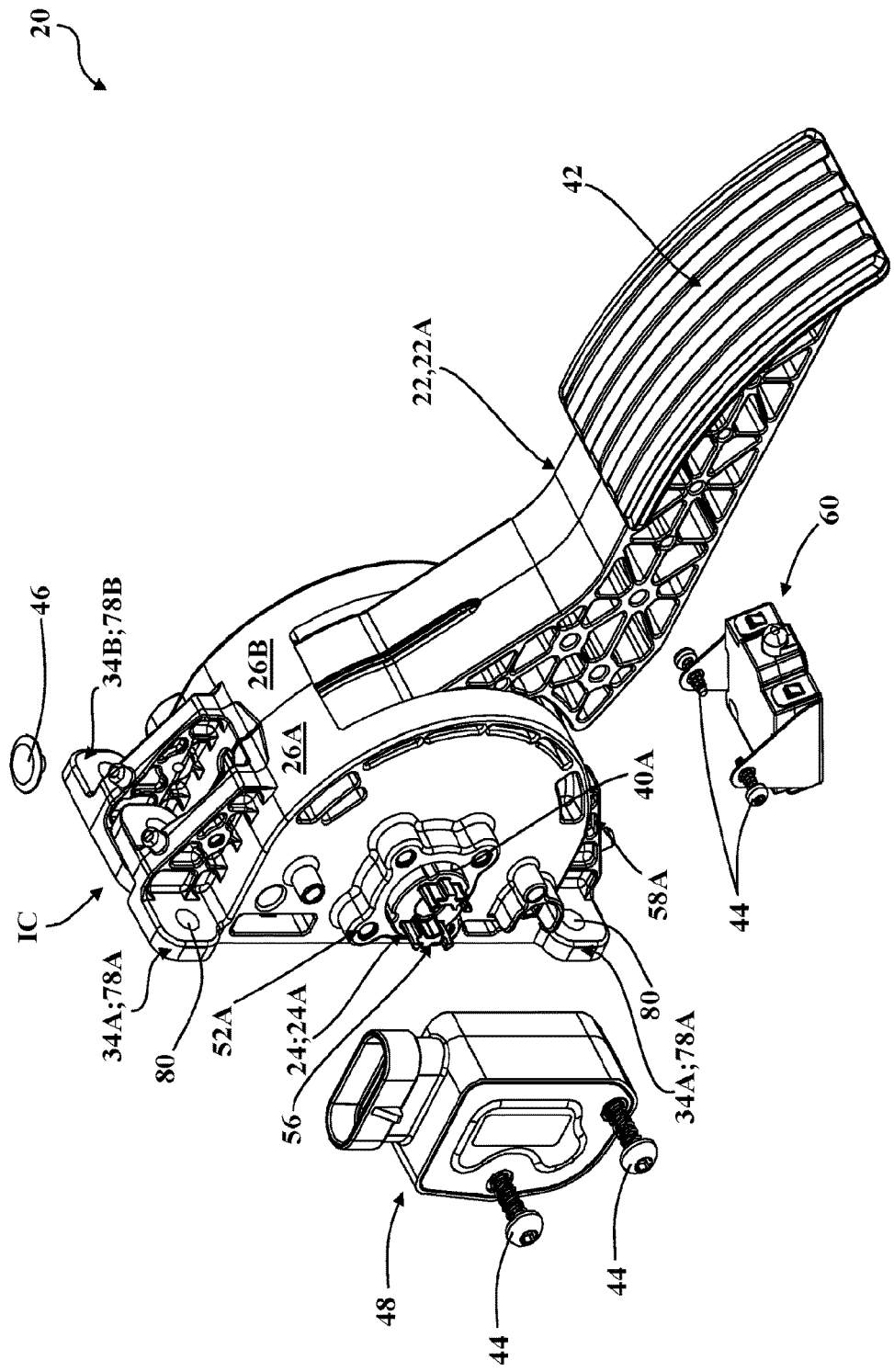
FIG. 2 is a partially exploded perspective view of the pedal assembly of FIG. 1, showing a plug, and a sensor and a kickdown mechanism spaced from the first and second housing components.
Figure 3:
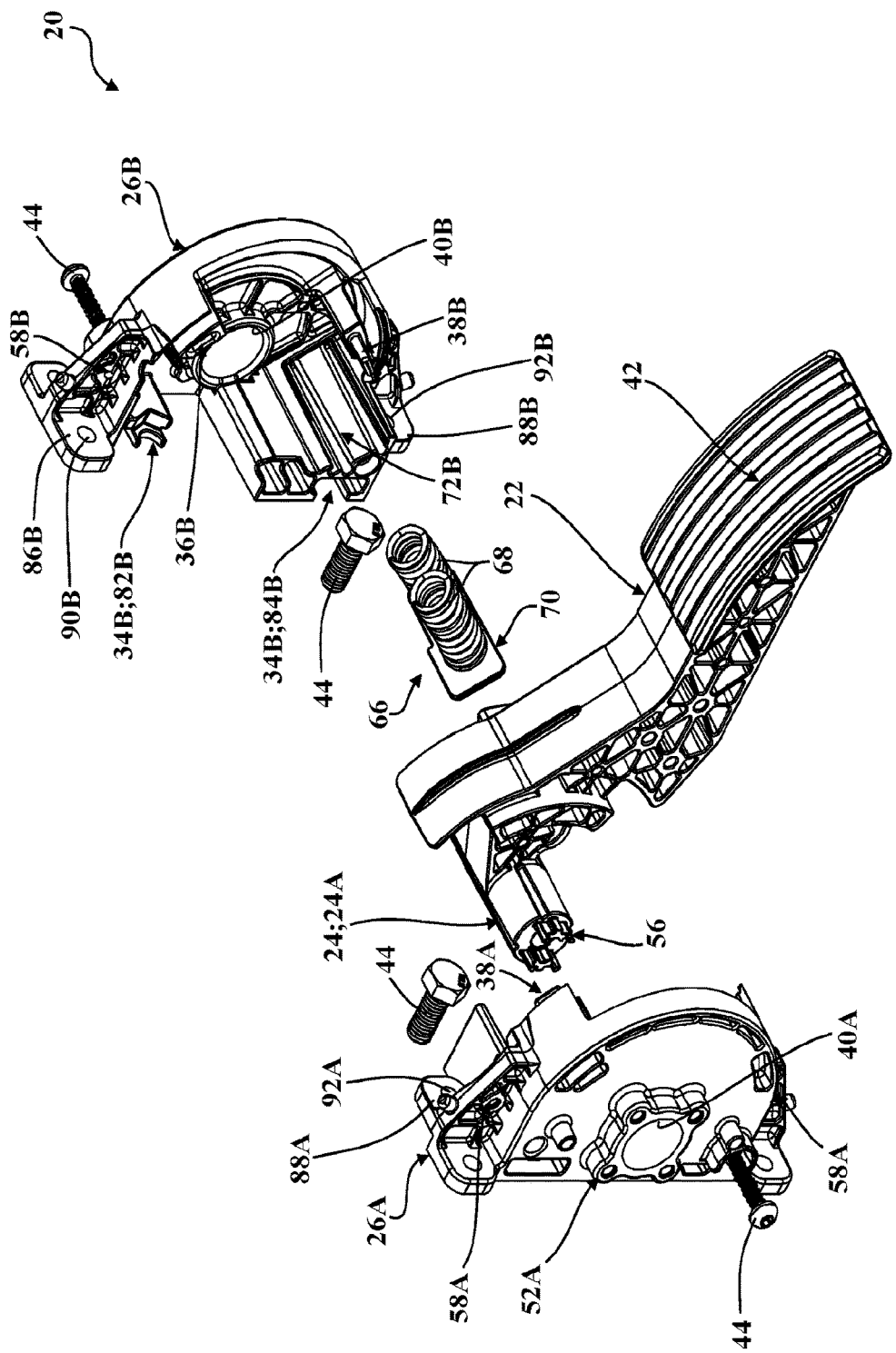
FIG. 3 is another partially exploded perspective view of the pedal assembly of FIG. 2, showing fasteners and a biasing mechanism interposed between the first and second housing components and the pedal arm.

Referring now to the drawings, where like numerals indicate like or corresponding parts throughout the several views, a pedal assembly is generally shown at 20 in FIGS. 1-3. The pedal assembly 20 is adapted for use in a vehicle (not shown, but generally known in the art) and allows a driver to selectively actuate the pedal assembly 20 so as to control the vehicle in operation, as described in greater detail below. To that end, the pedal assembly 20 could be realized as an "accelerator pedal" used to control vehicle acceleration and modulate vehicle speed, a "brake pedal" used to decelerate and stop the vehicle, a "clutch pedal" used to modulate translation of rotational torque between an engine and a transmission, and the like. Moreover, as will be appreciated from the subsequent description below, the pedal assembly 20 could be used to control the vehicle in any suitable way without departing from the scope of the present invention. While the pedal assembly 20 may advantageously be used to control vehicles that are operated in harsh environments, such as is known in the construction, agriculture, recreational, and/or power sports industries, those having ordinary skill in the art will appreciate that the vehicle could be of any suitable type or configuration without departing from the scope of the present invention. By way of non-limiting example, the vehicle could be a conventional All-Terrain Vehicle (ATV), a so-called "side-by-side" ATV, a tractor, a farming implement, a golf cart, an automotive vehicle, and the like.

Referring now to FIGS. 1-11, the pedal assembly 20 includes a pedal arm 22, a pivot shaft 24, a first housing component 26A, and a second housing component 26B. The second housing component 26B is identical to the first housing component 26A, as described in greater detail below. The pedal arm 22 is movable between a first pedal position 22A (see FIG. 5A) and a second pedal position 22B (see FIG. 5B). The pivot shaft 24 is operatively attached to the pedal arm 22 and defines a pivot axis PA.

The first housing component 26A has a first body 28A defining a first inner surface 30A and a first outer surface 32A. A first mount 34A is formed on the first body 28A and is adapted for attachment to the vehicle (not shown). A first receiver 36A is formed on the first body 28A and extends away from the first outer surface 32A. A first coupler 38A is formed on the first body 28A, extends away from the first outer surface 32A, and is disposed in spaced relation with the first receiver 36A. A first bore 40A is defined along the first inner surface 30A and is arranged between the first receiver 36A and the first coupler 38A to support at least a portion of the pivot shaft 24.

As noted above, the second housing component 26B is identical to the first housing component 26A described above. Specifically, the second housing component 26B has a second body 28B identical to the first body 28A. The second body 28B defines a second inner surface 30B identical to the first inner surface 30A and a second outer surface 32B identical to the first outer surface 32A. A second mount 34B, identical to the first mount 34A, is formed on the second body 28B and is adapted for attachment to the vehicle (not shown). A second receiver 36B, identical to the first receiver 36A, is formed on the second body 28B and extends away from the second outer surface 32B. A second coupler 38B, identical to the first coupler 38A, is formed on the second body 28B, extends away from the second outer surface 32B, and is disposed in spaced relation with the second receiver 36B. A second bore 40B, identical to the first bore 40A, is defined along the second inner surface 30B and is arranged between the second receiver 36B and the second coupler 38B to support at least a portion of the pivot shaft 24.

As is described in greater detail below, the first receiver 36A engages the second coupler 38B and the second receiver 36B engages the first coupler 38A in an interlocked configuration IC with the first bore 40A and the second bore 40B aligned about the pivot axis PA to rotatably support the pivot shaft 24 for rotation about the pivot axis PA in response to movement of the pedal arm 22. The pedal arm 22, the pivot shaft 24, and the housing components 26A, 26B will each be described in greater detail below.

Figure 4:
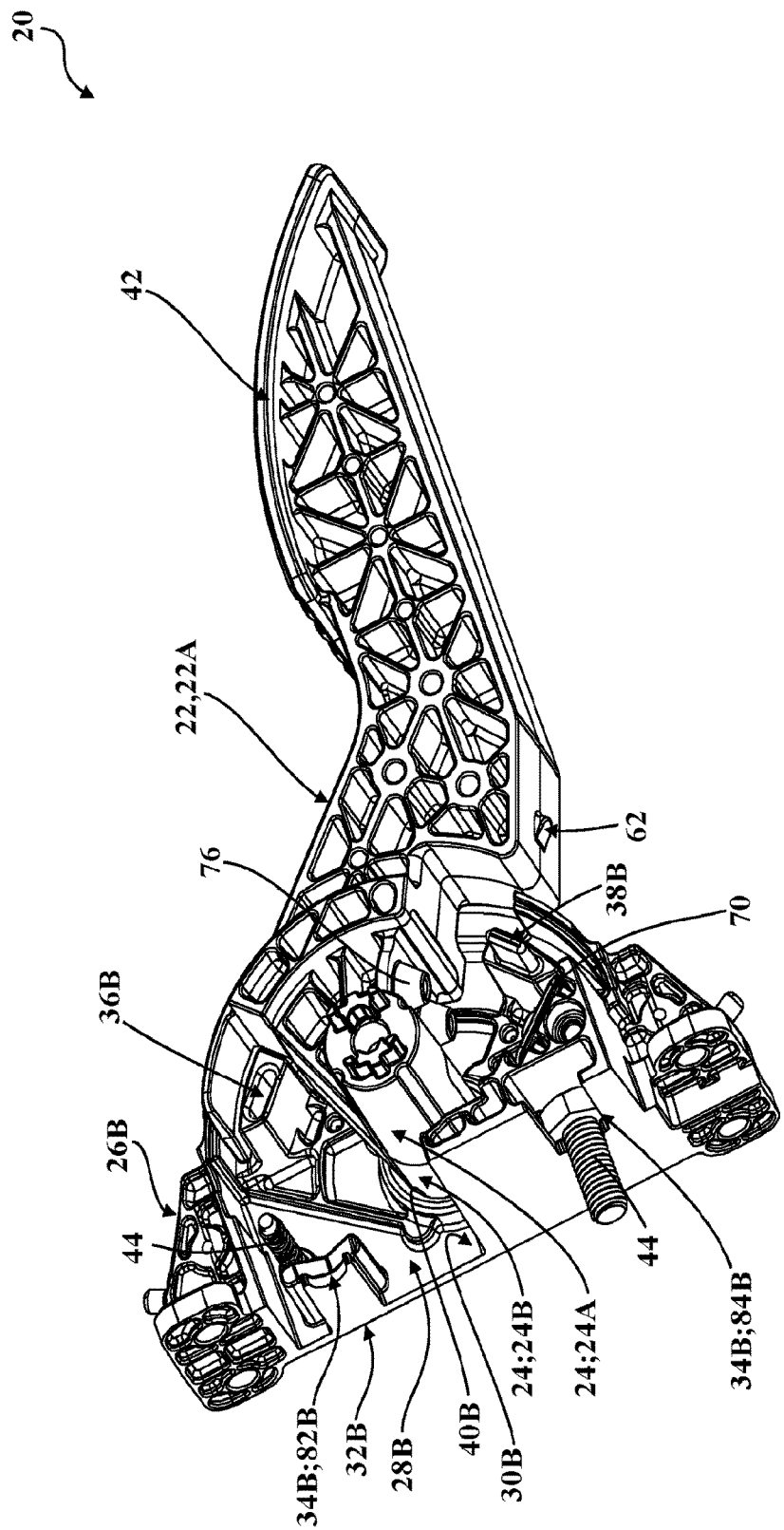
FIG. 4 is a perspective view of the pedal assembly of FIG. 3, showing the pedal arm, a portion of the biasing mechanism, and fasteners seated in the first housing component.
Figure 5A:
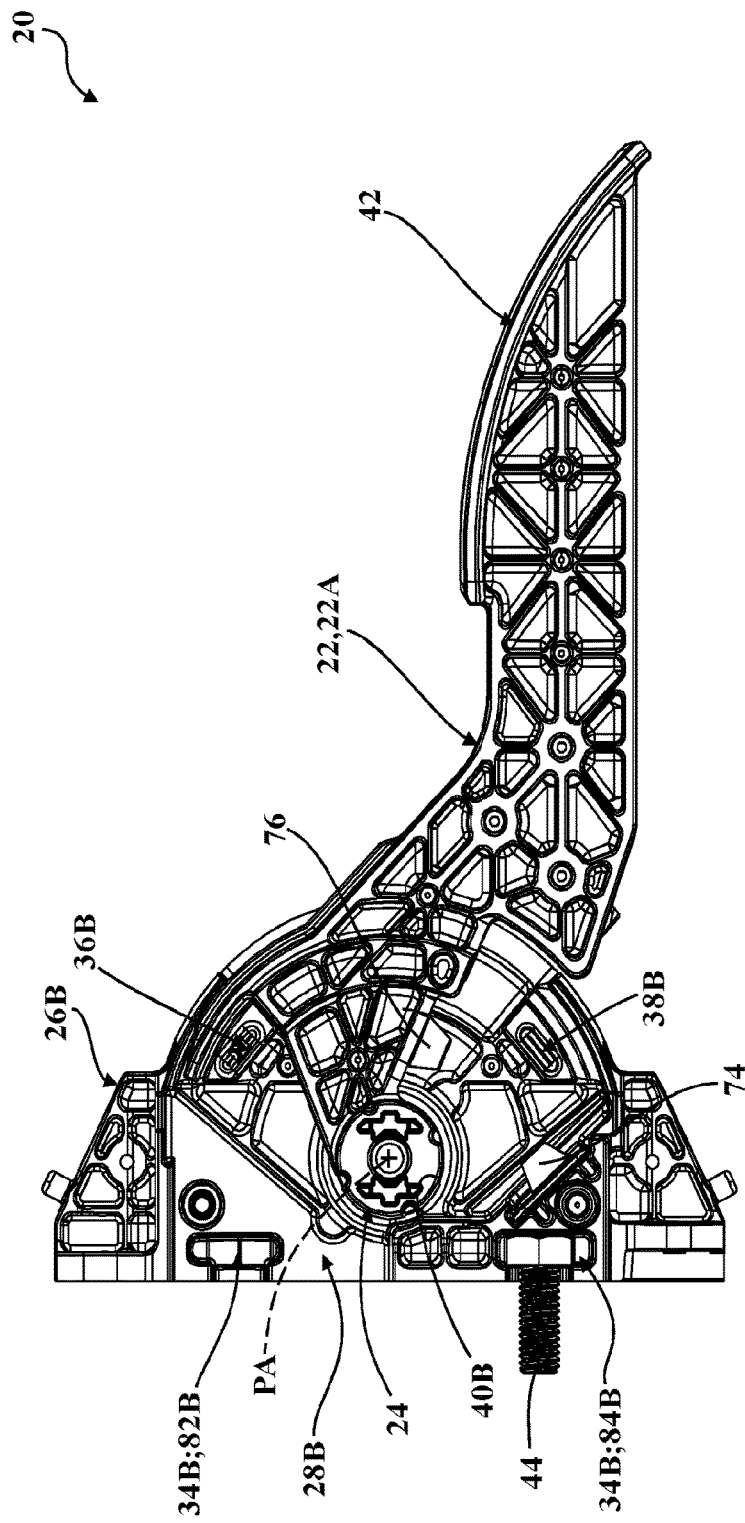
FIG. 5A is a left-side plan view of the components of the pedal assembly depicted in FIG. 4, shown with the pedal arm arranged in a first position.
Figure 5B:
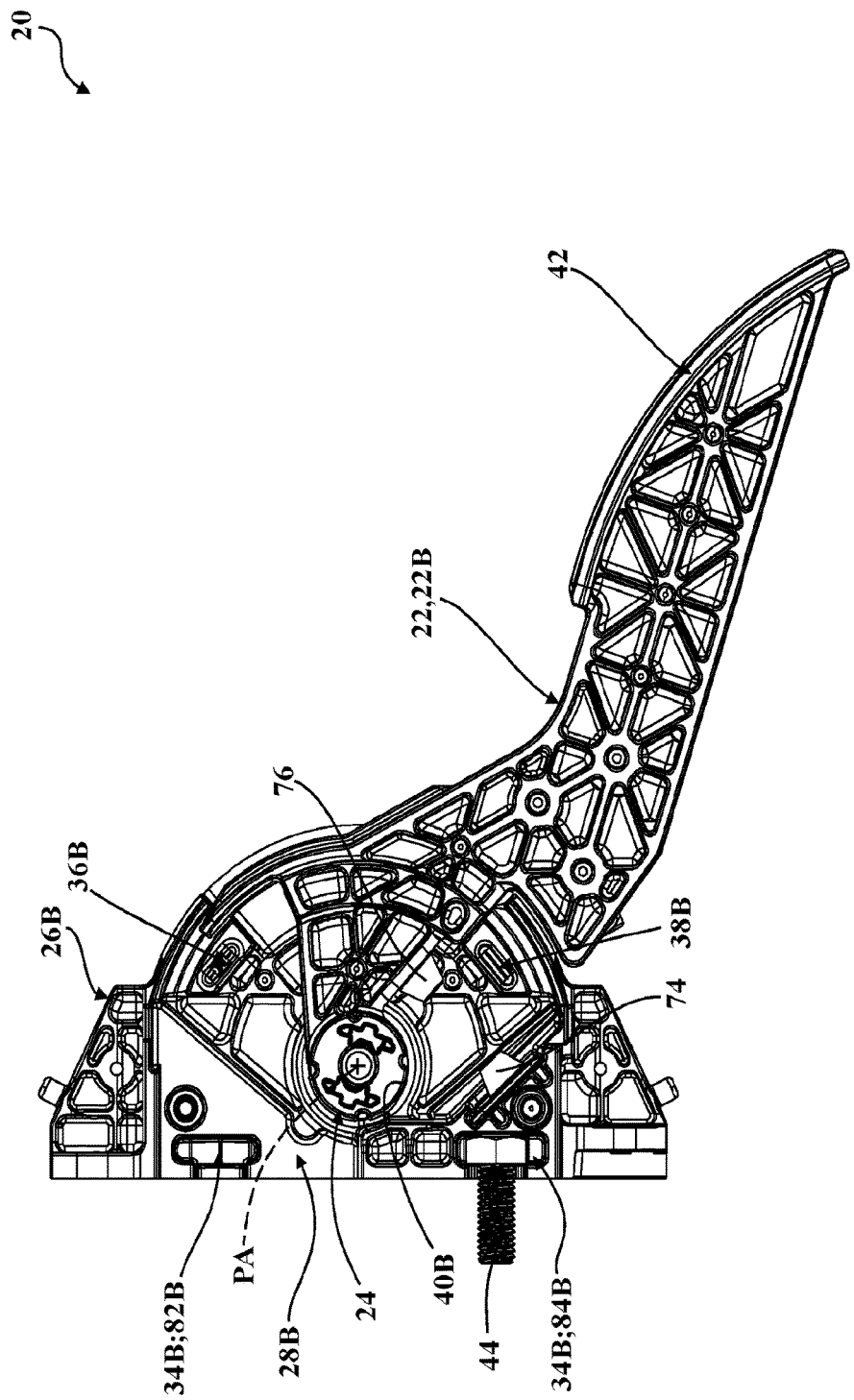
FIG. 5B is another left-side plan view of the components of the pedal assembly depicted in FIGS. 4-5A, shown with the pedal arm arranged in a second pedal position.
Figure 7:
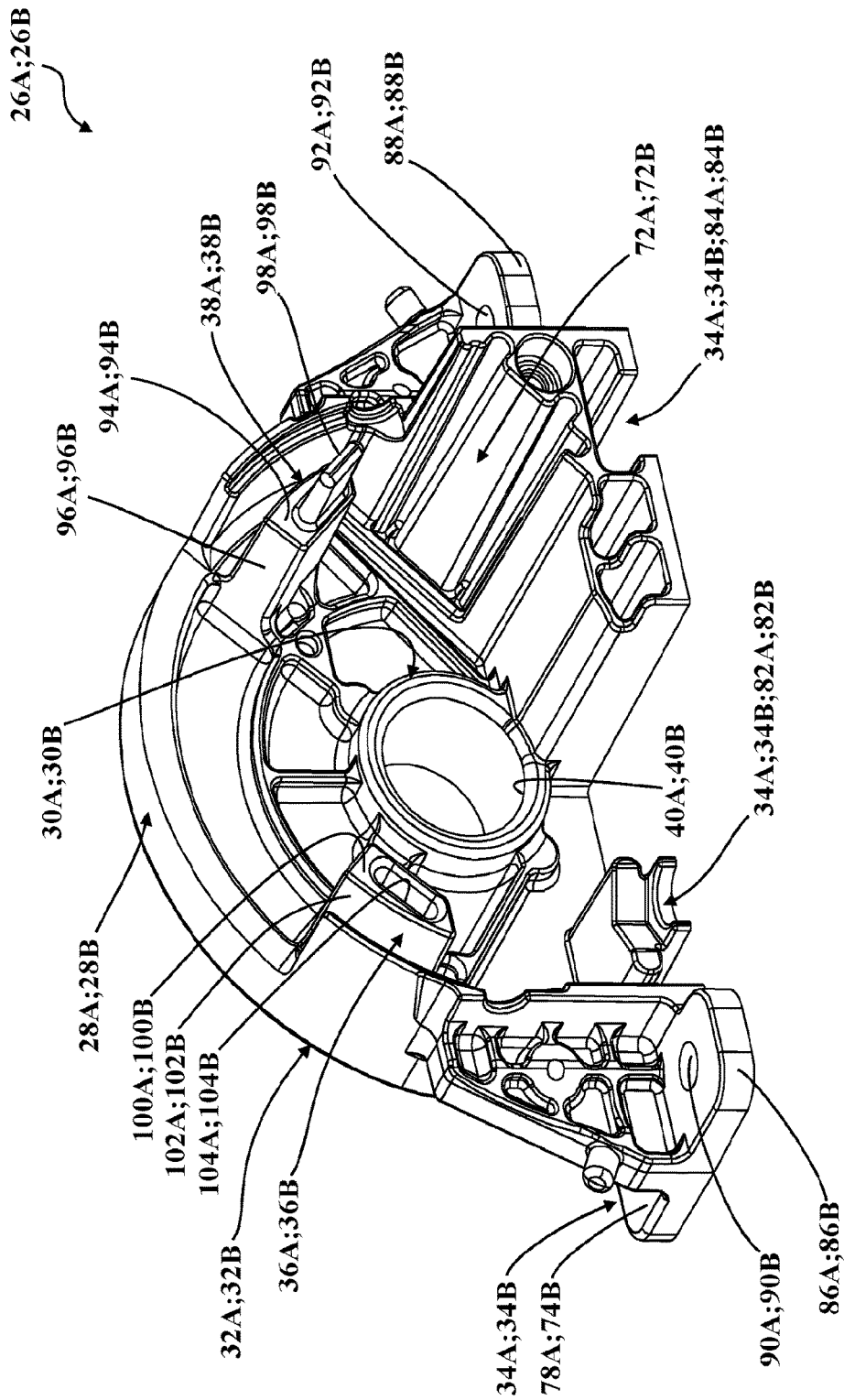
FIG. 7 is a perspective view of one of the housing components of FIGS. 1-5B.
Figure 8:
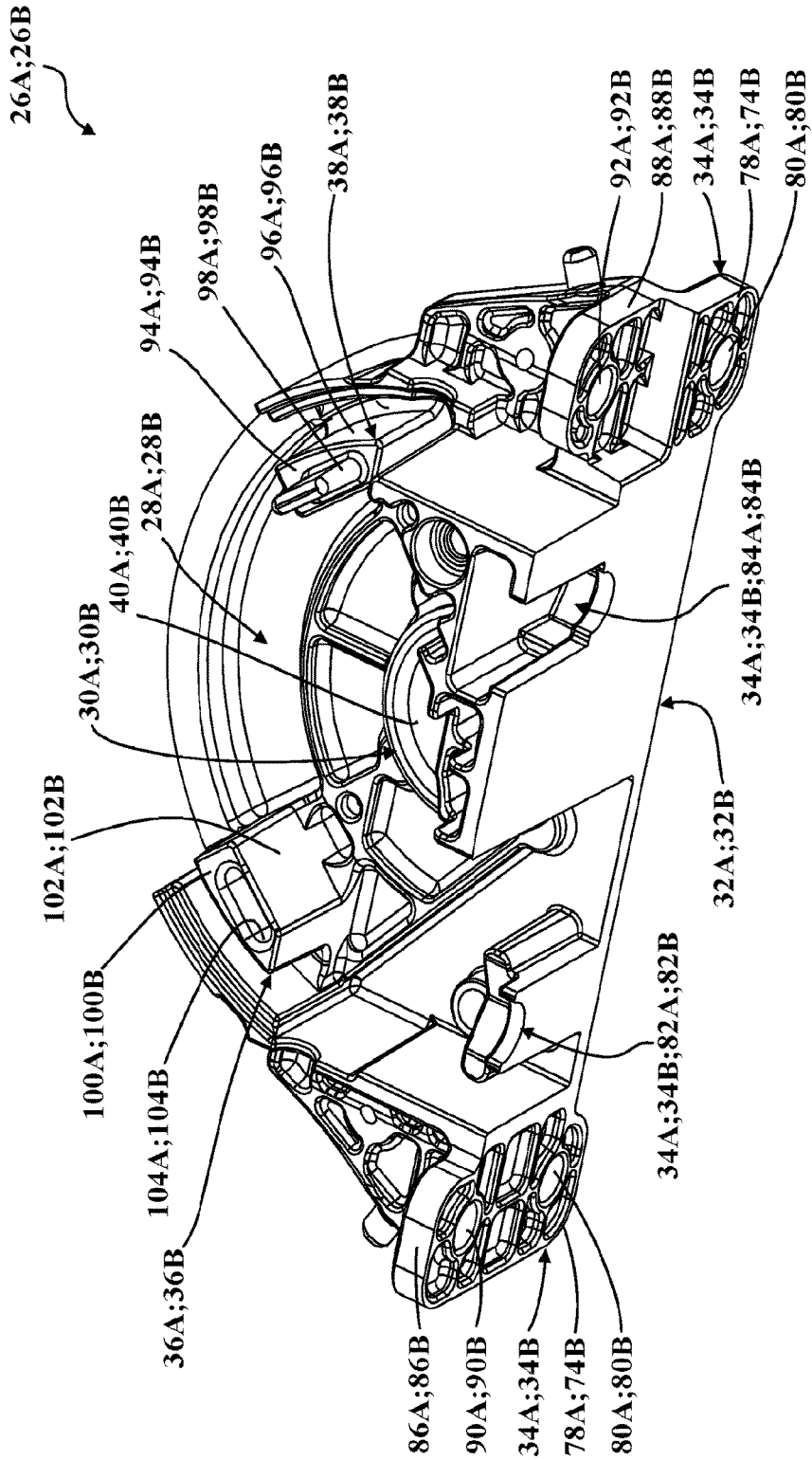
FIG. 8 is another perspective view of the housing component of FIG. 7.

For the purposes of clarity and consistency, certain drawing views only depict one of the identical first and second housing components 26A, 26B. Specifically, while FIGS. 1-3 and 9-11 depict both housing components 26A, 26B. FIGS. 4-5B, 7, and 8 only depict a single housing component. Here, in FIGS. 1-5B, the first and second housing components 26A, 26B have been arbitrarily labeled such that the housing component depicted in FIGS. 4-5B represents the second housing component 26B based on consistent orientation of the pedal arm 22 as shown in FIGS. 1-3. Moreover, because the first and second housing components 26A, 26B are identical, the views shown in FIGS. 7 and 8 depict a single housing component with labels corresponding to each housing component. Specifically, the housing component depicted in FIGS. 7 and 8 is labeled as both the first housing component 26A and the second housing component 26B. Moreover, subsequent description of either of the housing components 26A, 26B may be illustrated by only one of the housing components.

The pedal arm 22 includes a pad 42 adapted for engagement by the vehicle driver such that force applied to the pad 42 moves the pedal arm 22 between the first position 22A and the second position 22B to effect corresponding operation of the vehicle. By way of non-limiting example, where the pedal assembly 20 is implemented as an "actuator pedal" used to actuate a throttle of an internal-combustion engine (not shown), the first position 22A could correspond to "engine idle" and the second position 22B could correspond to "wide-open throttle". However, as noted above, the pedal assembly 20 could be used in connection with a number of different applications and, thus, those having ordinary skill in the art will appreciate that the first position 22A and/or the second position 22B could correspond to any suitable operating condition of the vehicle without departing from the scope of the present invention.

As best shown in FIG. 5, the pedal arm 22, the pivot shaft 24, and the pad 42 are formed as a unitary, one-piece component manufactured such as via an injection molding process, with the pedal arm 22 arranged extending between the pivot shaft 24 and the pad 42. However, those having ordinary skill in the art will appreciate that the pedal arm could be formed in any suitable way, from any number of components operatively attached in any suitable way, without departing from the scope of the present invention.

As noted above, the identical first and second housing components 26A, 26B are employed to support the pivot shaft 24 and the pedal assembly 20 via the first and second bores 40A, 40B. To this end, and according to the representative embodiment illustrated throughout the drawings, the first bore 40A is formed extending between the first inner surface 30A and the first outer surface 32A, and the second bore 40B is formed extending between the second inner surface 30B and the second outer surface 32B. Here, the pivot shaft 24 includes a first shaft portion 24A rotatably supported by the first bore 40A, and a second shaft portion 24B rotatably supported by the second bore 40B, to permit rotation of the pivot shaft 24 about the pivot axis PA as the pedal arm 22 moves between the first position 22A and the second position 22B. In the representative embodiment illustrated herein, the first shaft portion 24A, the second shaft portion 24B, and the pivot shaft 24 are formed as an integral, one-piece component.

Because the first shaft portion 24A directly engages the first bore 40A and the second shaft portion 24B directly engages the second bore 40B, the first and second housing components 26A, 26B and the pivot shaft 24 may advantageously be manufactured from materials that facilitate smooth rotatable engagement with each other. In one embodiment, the first and second housing components 26A, 26B are manufactured from acetal and the pivot shaft 24 is manufactured from glass-filled nylon. This configuration strikes a substantial balance between low manufacturing costs and strength while, at the same time, ensuring low-friction engagement in operation. In one embodiment, as shown best in FIGS. 4, 6, and 7, the first bore 40A and the second bore 40B each have an identical frustoconical configuration. Thus, in this embodiment, the first shaft portion 24A and the second shaft portion 24B also have corresponding frustoconical configurations. However, those having ordinary skill in the art will appreciate that the pivot shaft 24 and/or the first and second bores 40A, 40B could have any suitable configuration sufficient to rotatably support the pivot shaft 24 between the first and second housing components 26A, 26B without departing from the scope of the present invention.

As noted above, the first and second receivers 36A, 36B and the first and second couplers 38A, 38B cooperate to support the first and second housing components 26A, 26B in the interlocked configuration IC with the aligned first and second bores 40A, 40B rotatably supporting the pivot shaft 24. Once in the interlocked configuration IC, the first and second housing components 26A, 26B are fixed together using one or more fasteners 44, as is described in greater detail below (see FIGS. 2, 3, and 11). The first housing component 26A, the second housing component 26B, and the pedal arm 22 are advantageously shaped and arranged so as to inhibit ingress of contaminants towards the pivot shaft 24. In certain embodiments, the pedal assembly 20 employs a plug 46 to further inhibit ingress of contaminants (see FIGS. 1 and 2).

Referring now to FIGS. 1 and 2, as noted above, the pedal assembly 20 is used to facilitate control of the vehicle in operation. To that end, the pedal assembly 20 may include at least one sensor, generally indicated at 48, and a controller, shown schematically at 50 in FIG. 1, arranged in communication with the at least one sensor 48. In the representative embodiment illustrated herein, the pedal assembly 20 employs a rotational position sensor 48.

The first housing component 26A has a first sensor mount 52A formed on the first body 28A extending away from the first outer surface 32A, and the second housing component has a second sensor mount 52B, identical to the first sensor mount 52A, formed on the second body 28B extending away from the second outer surface 32B. Here, the rotational position sensor 48 is operatively attached to one of the first sensor mount 52A and the second sensor mount 52B, such as via fasteners 44, and is adapted to determine the angular position of the pivot shaft 24 about the pivot axis PA. To that end, in one embodiment, the rotational position sensor 48 employs an emitter 54 (see FIG. 6), and the pivot shaft 24 includes at least one coupling, generally indicated at 56 (see FIG. 2), which is shaped to engage and rotate concurrently with the emitter 54 as the pedal arm 22 moves between the first position 22A and the second position 22B. Thus, the rotational position sensor 48 is configured to determine the angular position of the emitter 54 as the pedal arm 22 moves with respect to the first and second housing components 26A, 26B. In the representative embodiment illustrated in FIG. 6, a shield and a pair of emitters realized as magnets are shown and are adapted for attachment to the coupling 56 on the pivot shaft 24 for concurrent rotation about the pivot axis PA, such as via cold staking (not shown). In the representative embodiment illustrated herein, the pivot shaft 24 includes a single coupling 56 configured to receive the emitter 54, and the sensor 48 is operatively attached to the first sensor mount 52A of the first housing component 26A. However, those having ordinary skill in the art will appreciate that the pivot shaft 24 could be implemented with more than one coupling 56 such that the emitter 54 and sensor 48 could be arranged differently, such as to facilitate mounting the sensor 48 to the second housing component 26B (not shown). Similarly, it will be appreciated that the sensor 48 could be arranged, clocked, or otherwise oriented in different ways depending on application requirements.

The first housing component 26A has a first auxiliary mount 58A formed on the first body 28A extending away from the first outer surface 32A, and the second housing component has a second auxiliary mount 58B, identical to the first auxiliary mount 58A, formed on the second body 28B extending away from the second outer surface 32B. Here, a kickdown mechanism, generally indicated at 60, is operatively attached to at least one of the first auxiliary mount 58A and the second auxiliary mount 58B, such as via fasteners 44, and is adapted to provide the vehicle driver with feedback as the pedal arm 22 approaches the second position 229. To this end, the pedal arm 22 is provided with an engagement surface 62 (see FIG. 4) arranged to abut the kickdown mechanism 60 to translate force from the kickdown mechanism 60 to the pedal arm 22 when approaching the second position 22B. It will be appreciated that the kickdown mechanism 60 could be configured in a number of different ways without departing from the scope of the present invention.

Similarly, it will be appreciated that the sensor 48 could be of any suitable type or configuration without departing from the scope of the present invention. The sensor 48 and controller 50 are disposed in electrical communication, such as by one or more wires 64, and cooperate to control the vehicle in response to changes in the position of the pedal arm 22. Here, as the driver of the vehicle actuates the pedal arm 22, the rotational position sensor 48 communicates the angular position of the pedal arm 22 to the controller 50 which, in turn, subsequently controls the vehicle in response, as noted above. By way of non-limiting example, where the pedal assembly 20 is implemented as an "accelerator pedal," the controller 50 could actuate an electronic throttle valve used to control an internal combustion engine used to propel the vehicle (not shown, but generally known in the art). Those having ordinary skill in the art will recognize this as a so-called "drive-by-wire" accelerator and throttle arrangement commonly utilized by conventional internal-combustion propelled vehicles of the type described above. Similarly, where the pedal assembly 20 is implemented as a "clutch pedal," the controller 50 could limit or otherwise control engine operation in response to signals from the sensor 48 indicating disengagement between the engine and the transmission. It will be appreciated the pedal assembly 20 could control the vehicle in other ways, with or without the use of the sensor 48, controller 50, and/or kickdown mechanism 60, without departing from the scope of the present invention. By way of non-limiting example, while the representative embodiment of the pedal assembly 20 illustrated herein is realized as an electronic pedal assembly 20 with the sensor 48 disposed in communication with the controller 50, the pedal assembly 20 could be realized as a mechanical pedal assembly, such as with a coupling arranged in force-translating relationship with a cable, linkage, and the like, arranged to effect control of the vehicle (not shown).

Figure 6:
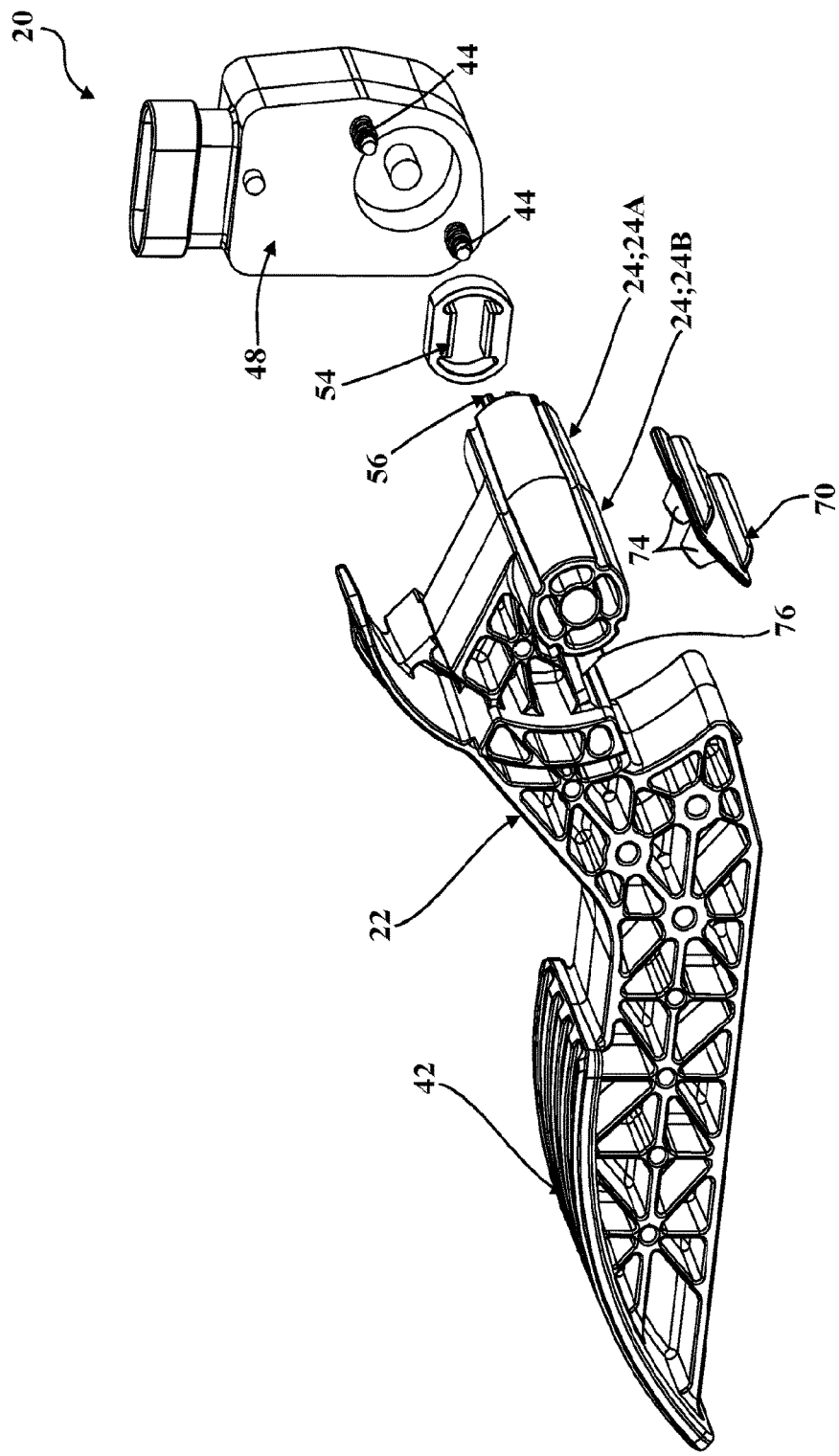
FIG. 6 is another perspective view of the pedal assembly of FIGS. 1-5B, showing the pedal arm, the sensor with an emitter and associated fasteners, and a portion of the biasing mechanism.

As is best shown in FIGS. 3, 4, and 6, the pedal assembly 20 employs a biasing mechanism, generally indicated at 66, interposed between the pedal arm 22 and at least one of the first and second housing components 26A, 26B. The biasing mechanism 66 is configured so as to urge the pedal arm 22 towards the first position 22A in absence of force applied to the pedal aim 22, such as via the pad 42. The biasing mechanism 66 includes a biasing element 68, such as one or more arcuate compression springs, and a bias plate 70 supporting the biasing element 68 interposed between the housing components 26A, 26B and the pedal arm 22 (see FIGS. 3 and 6). Here, the bias plate 70 is formed as a separate component from the first and second housing components 26A, 26B and is supported between or otherwise captured by at least one of the housing components 26A, 26B. To this end, the first housing component 26A has a first keeper 72A formed on the first body 28A extending away from the first outer surface 32A, and the second housing component 26B has a second keeper 72B, identical to the first keeper 72A, formed on the second body 28B extending away from the second outer surface 32B. Here, at least one of the first keeper 72A and the second keeper 72B retains the bias plate 70 when the first and second housing components 26A, 26B are in the interlocked configuration IC. In the representative embodiment illustrated herein, first keeper 72A and the second keeper 72B cooperate to retain the bias plate 70 (see FIG. 10). The bias plate 70 has at least one bias projection 74, and the pedal arm 22 has at least one arm projection 76, both of which are shaped to retain the biasing element 68 in operation. However, those having ordinary skill in the art will appreciate that the pedal arm 22 could be biased in other ways without departing from the scope of the present invention.

Referring now to FIGS. 3, 4, and 7-9, as noted above, the first and second housing components 26A, 26B each employ mounts 34A, 34B formed on the respective bodies 28A, 28B so as to facilitate connection to a portion of the vehicle. As will be appreciated from the subsequent description below, the mounts 34A, 35B can be configured and/or arranged in a number of different ways without departing from the scope of the present invention. Moreover, it will be appreciated that each of the housing components 26A, 26B could include identical pluralities of mounts of different or similar configurations. In one embodiment, at least one fastener 44 is operatively attached to at least one of the first mount 34A and the second mount 34B to secure the pedal assembly 20 to a portion of the vehicle. To this end, in one embodiment, the first mount 34A includes at least one first tab 78A extending from the first body 28A and defining a first tab aperture 80A, and the second mount 34B includes at least one second tab 78B, identical to the first tab 78A, extending from the second body 28B and defining a second tab aperture 80B identical to the first tab aperture 80A. Here, the apertures 80A, 80B are realized as "through holes" and are each adapted for attachment to a portion of the vehicle, such as by fasteners 44. In another embodiment, the first mount 34A includes a first brace 82A and a first receptacle 84A disposed in spaced relation with the first brace 82A, and the second mount 34B includes a second brace 82B, identical to the first brace 82A, and a second receptacle 84B, identical to the first receptacle 84B and disposed in spaced relation with the second brace 82B. Here, when the first and second housing components 26A, 26B are in the interlocked configuration IC, the first brace 82A and the second receptacle 84B cooperate to accommodate one fastener 44, and the second brace 82B and the first receptacle 84A cooperate to accommodate another fastener 44. In this embodiment, the braces 82A, 82B and the receptacles 84A, 84B are advantageously configured to prevent rotation of an accommodated fastener 44 so as to facilitate "stud mounting" of the pedal assembly 20 to a portion of the vehicle. It will be appreciated that a single fastener 44 accommodated in this way could be used for certain applications, and that other fasteners 44 could also or alternatively be employed, through one or more apertures 80A, 80B as noted above, to secure the pedal assembly 20 to a portion of the vehicle.

Figure 10:
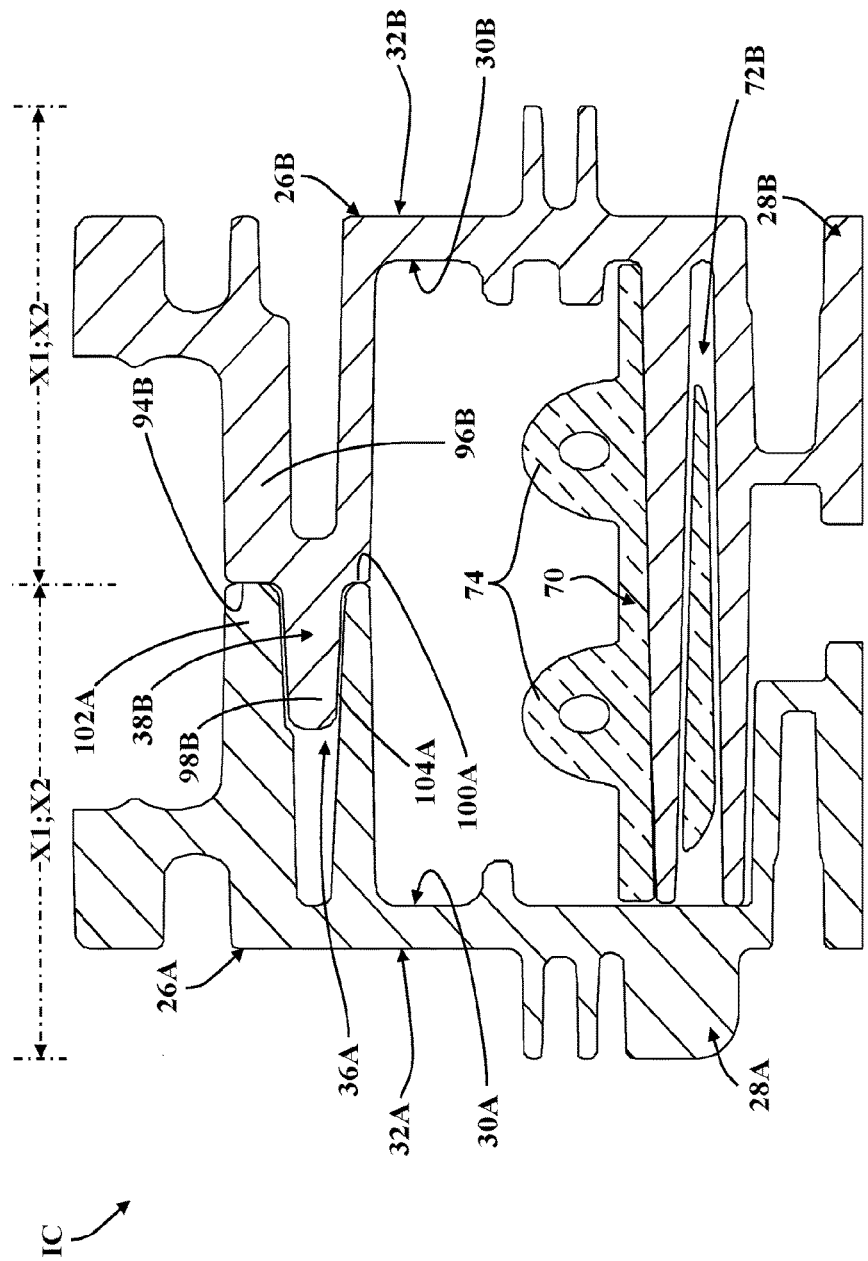
FIG. 10 is a slice sectional view taken along line 10-10 of FIG. 9.
Figure 11:
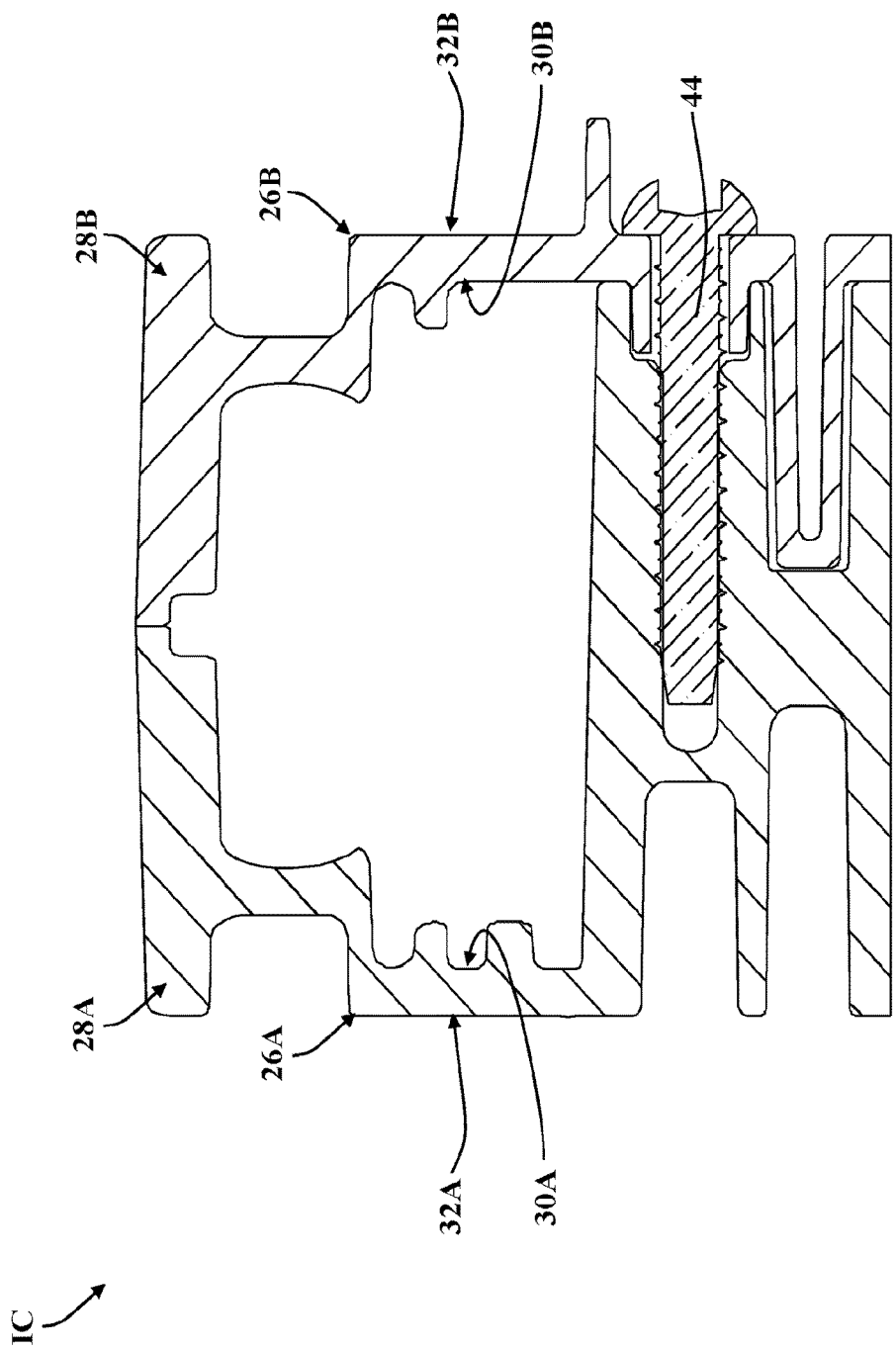
FIG. 11 is a slice sectional view taken along line 11-11 of FIG. 9.

Referring now to FIGS. 7, 8, and 10, in one embodiment, the first housing component 26A further includes a first flange 86A formed on the first body 28A, and a first shelf 88A formed on the first body 28A disposed in spaced relation with the first flange 86A; and the second housing component 26B further includes a second flange 86B identical to the first flange 86A and formed on the second body 28B, and a second shelf 88B identical to the first shelf 88A and formed on the second body 28B disposed in spaced relation with the second flange 86B. Here, when the first and second housing components 26A, 26B are in the interlocked configuration IC, the first shelf 88A abuts the second flange 86B and the second shelf 88B abuts the first flange 86A. In the representative embodiment illustrated herein, the first flange 86A defines a first flange aperture 90A and the second flange 86B defines a second flange aperture 90B identical to the first flange aperture 90A; and the first shelf 88A defines a first shelf aperture 92A and the second shelf 88B defines a second shelf aperture 92B identical to the first shelf aperture 92A. Here, like the tab apertures 80A, 80B described above, the flange apertures 90A, 90B and the shelf apertures 92A, 92B are each adapted for attachment to a portion of the vehicle, such as via a fastener 44.

Figure 9:
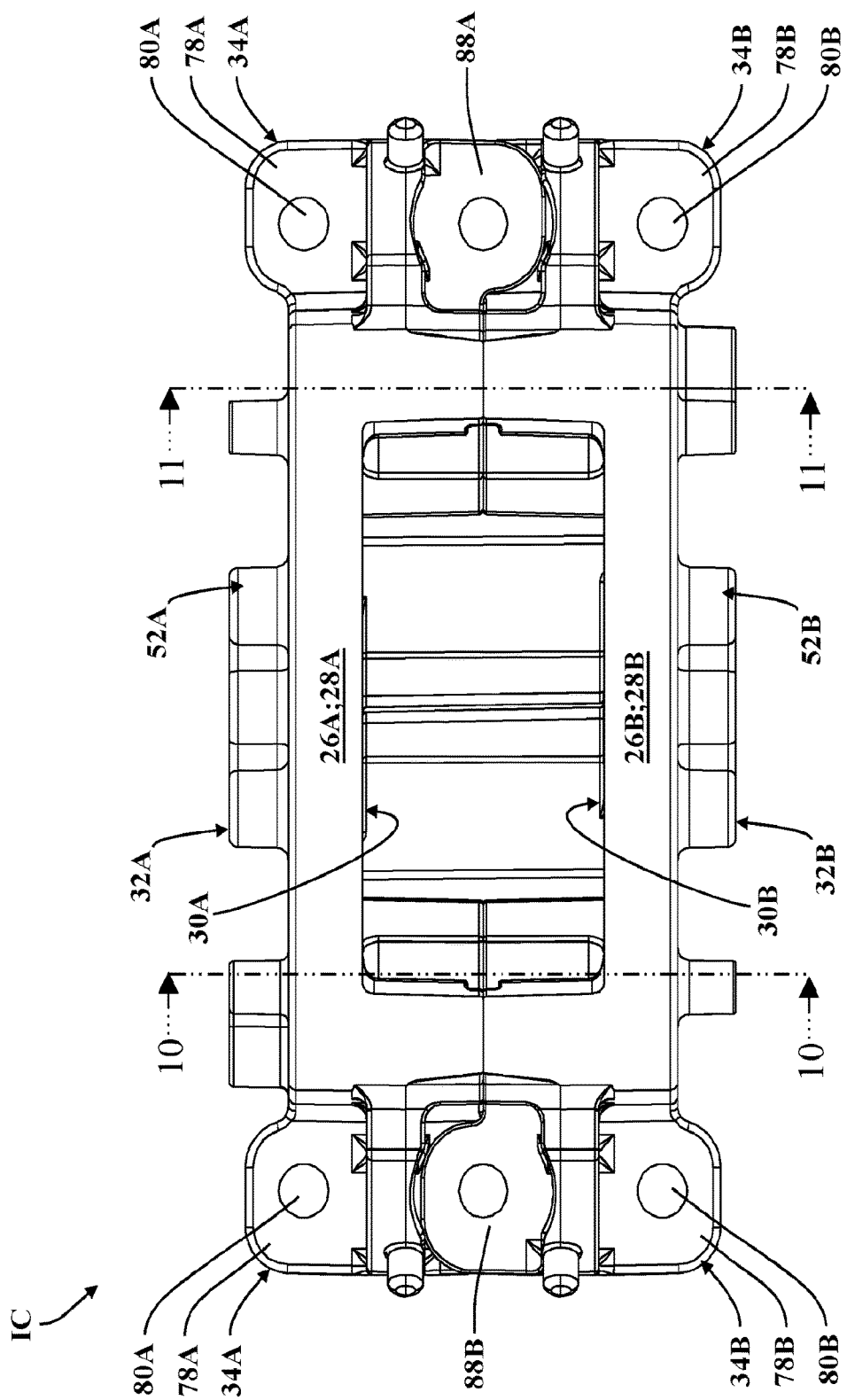
FIG. 9 is a top-side plan view of a portion of the pedal assembly of in FIGS. 1-3, showing the first and second housing components arranged in an interlocked configuration.

As is best illustrated by comparing FIGS. 1 and 9, when the first and second housing components 26A, 26B are in the interlocked configuration IC, the first flange aperture 90A aligns with the second shelf aperture 92B and the second flange aperture 90B aligns with the first shelf aperture 92A.

Thus, a single fastener 44 can pass through both the first flange aperture 90A and the second shelf aperture 92B, and a different fastener 44 can pass through both the second flange aperture 90B and the first shelf aperture 92A. In the representative embodiment illustrated herein, the tabs 78A, 78B and the flanges 86A, 86B are of similar construction, each having a generally rounded rectangular configuration protruding outwardly from the respective bodies 28A, 28B. The shelves 88A, 88B also have a generally rounded rectangular configuration, but are positioned to engage the flanges 86A, 86B to contribute to rigidity between the first and second housing components 26A, 26B. In the representative embodiment illustrated herein, the shelves 88A, 88B are spaced closer to the pivot axis PA than the flanges 86A, 86B, and are disposed closer to the couplers 38A, 38B than to the receivers 36A, 36B. Similarly, the flanges 86A, 86B are disposed closer to the receivers 36A, 36B than to the couplers 38A, 38B. However, those having ordinary skill in the art will appreciate that different arrangements, orientations, and configurations are conceivable.

Referring now to FIGS. 7-11, as noted above, the first receiver 36A engages the second coupler 38B and the second receiver 36B engages the first coupler 38A in an interlocked configuration IC with the first bore 40A and the second bore 40B aligned about the pivot axis PA. To this end, in one embodiment, the first coupler 38A includes a first coupler surface 94A, a first coupler body 96A extending between the first coupler surface 94A and the first inner surface 30A of the first body 28A, and a first coupler tooth 98A extending from the first coupler surface 94A away from the first coupler body 96A to be received by the second receiver 36B of the second housing component 26B. Similarly, the second coupler 38B includes a second coupler surface 94B identical to the first coupler surface 94A, a second coupler body 969 identical to the first coupler body 96A and extending between the second coupler surface 94B and the second inner surface 30B of the second body 28B, and a second coupler tooth 98B identical to the first coupler tooth 98A and extending from the second coupler surface 94B away from the second coupler body 96B to be received by the first receiver 36A of the first housing component 26A.

With continued reference to FIGS. 7-11, in one embodiment, the first receiver 36A includes a first receiver surface 100A, a first receiver body 102A extending between the first receiver surface 100A and the first inner surface 30A of the first body 28A, and a first receiver aperture 104A defined in the first receiver surface 100A and shaped to receive the second coupler tooth 98B. Similarly, the second receiver 26B includes a second receiver surface 100B identical to the first receiver surface 100A, a second receiver body 102B identical to the first receiver body 102A and extending between the second receiver surface 100B and the second inner surface 30B of the second body 28B, and a second receiver aperture 104B identical to the first receiver aperture 104A defined in the second receiver surface 100B and shaped to receive the first coupler tooth 98A.

As is best illustrated in FIG. 10, the first receiver surface 100A is parallel to the first coupler surface 94A, and the second receiver surface 100B is parallel to the second coupler surface 94B. The first receiver surface 100A and the first coupler surface 94A are each spaced from the first outer surface 32A of the first body 28A at a first common distance X1, and the second receiver surface 100B and the second coupler surface 94B are each spaced from the second outer surface 32B of the second body 28B at a second common distance X2 equal to the first common distance X1. Here, when the first and second housing components 26A, 26B are in the interlocked configuration IC, the first receiver surface 100A abuts the second coupler surface 94B, and the second receiver surface 100B abuts the first coupler surface 94A. Similarly, when the first and second housing components 26A, 26B are in the interlocked configuration IC, the first receiver aperture 104A engages the second coupler tooth 98B and the second receiver aperture 104B engages the first coupler tooth 98A. Here, the coupler teeth 98A, 98B each have an identical, tapered, generally-rectangular configuration, and the receiver apertures 104A, 104B each have an identical configuration which is complimentary to that of the coupler teeth 98A, 98B.

In this way, the identical first and second housing components 26A, 26B of the pedal assembly 20 of the present invention significantly reduce the cost and complexity involved in manufacturing and assembling pedal assemblies 20. Specifically, those having ordinary skill in the art will appreciate that common tooling can be employed to manufacture the housing components 26A, 26B. Moreover, because the housing components 26A, 26B are identical, significant advantages are afforded concerning part storage, dunnage, shipping, inventory control, and the like. Similarly, the implementation of the identical housing components 26A, 26B described herein affords further advantages related to assembly of pedal assemblies 20, such as lean manufacturing and simplified assembly automation. In light of the foregoing, it will be appreciated that the pedal assembly 20 of the present invention provides improved functionality and usability in connection with vehicles and, at the same time, reduces the cost and complexity of manufacturing and assembling pedal assemblies.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:
1. A pedal assembly for a vehicle, comprising:
a pedal arm;
a pivot shaft operatively attached to said pedal arm with said pivot shaft defining a pivot axis;
a first housing component having:
 a first body defining a first inner surface and a first outer surface,
 a first mount formed on said first body and adapted for attachment to the vehicle,
 a first receiver formed on said first body extending away from said first outer surface,
 a first coupler formed on said first body extending away from said first outer surface and disposed in spaced relation with said first receiver, and
 a first bore defined along said first inner surface arranged between said first receiver and said first coupler to support said pivot shaft; and
a second housing component having:
 a second body identical to said first body with said second body defining a second inner surface identical to said first inner surface and a second outer surface identical to said first outer surface,
 a second mount identical to said first mount with said second mount formed on said second body and adapted for attachment to the vehicle, a second receiver identical to said first receiver with said second receiver formed on said second body extending away from said second outer surface, a second coupler identical to said first coupler with said second coupler formed on said second body extending away from said second outer surface and disposed in spaced relation with said second receiver, and a second bore identical to said first bore with said second bore defined along said second inner surface arranged between said second receiver and said second coupler to support said pivot shaft;

wherein said first receiver engages said second coupler and said second receiver engages said first coupler in an interlocked configuration when said first housing component is mounted to said second housing component with said first bore and said second bore being aligned about said pivot axis to rotatably support said pivot shaft for rotation about said pivot axis in response to movement of said pedal arm.

2. The pedal assembly as set forth in claim 1, wherein said first coupler includes a first coupler surface, a first coupler body extending between said first coupler surface and said first inner surface of said first body, and a first coupler tooth extending from said first coupler surface away from said first coupler body to be received by said second receiver of said second housing component; and wherein said second coupler includes a second coupler surface identical to said first coupler surface, a second coupler body identical to said first coupler body with said second coupler body extending between said second coupler surface and said second inner surface of said first body, and a second coupler tooth identical to said first coupler tooth with said second coupler tooth extending from said second coupler surface away from said second coupler body to be received by said first receiver of said first housing component.

3. The pedal assembly as set forth in claim 2, wherein said first receiver includes a first receiver surface, a first receiver body extending between said first receiver surface and said first inner surface of said first body, and a first receiver aperture defined in said first receiver surface and shaped to receive said second coupler tooth; and wherein said second receiver includes a second receiver surface identical to said first receiver surface, a second receiver body identical to said first receiver body with said second receiver body extending between said second receiver surface and said second inner surface of said second body, and a second receiver aperture identical to said first receiver aperture with said second receiver aperture defined in said second receiver surface and shaped to receive said first coupler tooth.

4. The pedal assembly as set forth in claim 3, wherein said first receiver surface is parallel to said first coupler surface; and wherein said second receiver surface is parallel to said second coupler surface.

5. The pedal assembly as set forth in claim 3, wherein said first receiver surface and said first coupler surface are each spaced from said first outer surface of said first body at a first common distance; and wherein said second receiver surface and said second coupler surface are each spaced from said second outer surface is aligned with said second coupler surface of said second body at a second common distance identical to said first common distance.

6. The pedal assembly as set forth in claim 3, wherein said first receiver surface abuts said second coupler surface and said second receiver surface abuts said first coupler surface when said first housing component and said second housing component are in said interlocked configuration.

7. The pedal assembly as set forth in claim 3, wherein said first receiver aperture engages said second coupler tooth and said second receiver aperture engages said first coupler tooth when said first housing component and said second housing component are in said interlocked configuration.

8. The pedal assembly as set forth in claim 3, wherein said first coupler tooth and said second coupler tooth each have an identical generally-rectangular configuration.

9. The pedal assembly as set forth in claim 1, wherein said first bore is formed between said first inner surface and said first outer surface; and wherein said second bore is formed between said second inner surface and said second outer surface.

10. The pedal assembly as set forth in claim 1, wherein said first bore and said second bore each have an identical frustoconical configuration.

11. The pedal assembly as set forth in claim 1, wherein said pivot shaft includes:

a first shaft portion supported by said first bore of said first housing component, and a second shaft portion supported by said second bore of said second housing component.

12. The pedal assembly as set forth in claim 11, wherein said first shaft portion and said second shaft portion each have a frustoconical configuration.

13. The pedal assembly as set forth in claim 11, wherein said first shaft portion, said second shaft portion, and said pivot shaft are formed as an integral, one-piece component.

14. The pedal assembly as set forth in claim 1, wherein said pivot shaft and said pedal arm are formed as an integral, one-piece component.

15. The pedal assembly as set forth in claim 1, wherein said first housing component further includes a first flange formed on said first body, and a first shelf formed on said first body with said first shelf disposed in spaced relation with said first flange;

wherein said second housing component includes a second flange identical to said first flange with said second flange formed on said second body, and a second shelf identical to said first shelf with said second shelf formed on said second body and with said second shelf disposed in spaced relation with said second flange; and wherein said first shelf abuts said second flange and said second shelf abuts said first flange when said first housing component and said second housing component are in said interlocked configuration.

16. The pedal assembly as set forth in claim 15, wherein said first flange defines a first flange aperture and said second flange defines a second flange aperture identical to said first flange aperture;

wherein said first shelf defines a first shelf aperture and said second shelf defines a second shelf aperture identical to said first shelf aperture; and wherein said first flange aperture, said second flange aperture, said first shelf aperture, and said second shelf aperture are each adapted for attachment to a portion of the vehicle.

17. The pedal assembly as set forth in claim 16, wherein said first flange aperture aligns with said second shelf aperture, and said second flange aperture aligns with said first shelf aperture, when said first housing component and said second housing component are in said interlocked configuration.

18. The pedal assembly as set forth in claim 1, wherein said first mount includes a first tab extending from said first body; and
   wherein said second mount includes a second tab identical to said first tab with said second tab extending from said second body.

19. The pedal assembly as set forth in claim 18, wherein said first tab defines a first tab aperture and said second tab defines a second tab aperture identical to said first aperture; and
   wherein said first tab aperture and said second tab aperture are each adapted for attachment to a portion of the vehicle.

20. The pedal assembly as set forth in claim 1, further including at least one fastener operatively attached to one of said first mount and said second mount to secure said pedal assembly to a portion of the vehicle.

21. The pedal assembly as set forth in claim 20, wherein said first mount includes a first brace, and a first receptacle disposed in spaced relation with said first brace;
   wherein said second mount includes a second brace identical to said first brace, and a second receptacle identical to said first receptacle with said second receptacle disposed in spaced relation with said second brace; and
   wherein said first brace and said second receptacle cooperate to accommodate one fastener, and said second brace and said first receptacle cooperate to accommodate another fastener, when said first housing component and said second housing component are in said interlocked configuration.

22. The pedal assembly as set forth in claim 1, further including a biasing element interposed between said pedal arm and at least one of said first housing component and said second housing component with said biasing element configured to urge said pedal arm to a first position.

23. The pedal assembly as set forth in claim 22, further including a bias plate interposed between said biasing element and at least one of said first housing component and said second housing component.

24. The pedal assembly as set forth in claim 23, wherein said bias plate has a bias projection, and said pedal arm has an arm projection, said bias projection and said arm projection cooperating to retain said biasing element.

25. The pedal assembly as set forth in claim 23, wherein said first housing component has a first keeper formed on said first body extending away from said first outer surface;
   wherein said second housing component has a second keeper identical to said first keeper with said second keeper formed on said second body extending away from said second outer surface; and
   wherein at least one of said first keeper and said second keeper retains said bias plate when said first housing component and said second housing component are in said interlocked configuration.

26. The pedal assembly as set forth in claim 25, wherein said first keeper and said second keeper cooperate to retain said bias plate.

27. The pedal assembly as set forth in claim 1, further including a rotational position sensor disposed in rotational communication with said pivot shaft.

28. The pedal assembly as set forth in claim 27, wherein said first housing component has a first sensor mount formed on said first body extending away from said first outer surface;
   wherein said second housing component has a second sensor mount identical to said first sensor mount with said second sensor mount formed on said second body extending away from said second outer surface; and
   wherein said rotational position sensor is operatively attached to one of said first sensor mount and said second sensor mount.

* * * * *